United States Patent
Bikumala (10) Patent No.: US 10,037,238 B2
(45) Date of Patent: Jul. 31, 2018

(54) SYSTEM AND METHOD FOR ENCODING EXCEPTION CONDITIONS INCLUDED AT A REMEDIATION DATABASE

(71) Applicant: DELL PRODUCTS, LP, Round Rock, TX (US)

(72) Inventor: Sathish Kumar Bikumala, Round Rock, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 101 days.

(21) Appl. No.: 15/040,583

(22) Filed: Feb. 10, 2016

(65) Prior Publication Data

US 2017/0228273 A1    Aug. 10, 2017

(51) Int. Cl.
  *G06F 11/00*  (2006.01)
  *G06F 11/07*  (2006.01)

(52) U.S. Cl.
  CPC ........ *G06F 11/079* (2013.01); *G06F 11/0706* (2013.01); *G06F 11/0793* (2013.01); *G06F 11/0751* (2013.01); *G06F 11/0766* (2013.01)

(58) Field of Classification Search
  CPC .................................................... G06F 11/079
  See application file for complete search history.

(56) References Cited

U.S. PATENT DOCUMENTS

| | | | | |
|---|---|---|---|---|
| 7,477,960 B2 * | 1/2009 | Willis | ................. | G05B 19/4184 700/110 |
| 7,930,590 B2 * | 4/2011 | Cheng | ................... | G06F 11/366 714/25 |
| 7,996,730 B2 * | 8/2011 | Haller | ................. | G06F 11/2294 714/48 |
| 8,296,605 B2 * | 10/2012 | John | ................... | G06F 11/0793 714/25 |
| 8,527,814 B1 * | 9/2013 | Elwell | ................. | G06F 11/0709 714/2 |
| 8,532,988 B2 * | 9/2013 | Hyvonen | .......... | G06F 17/30985 375/288 |

(Continued)

OTHER PUBLICATIONS

"Application Recovery and Restart," Microsoft Windows10 Development Center, 2016, https://msdn.microsoft.com/en-us/library/windows/desktop/cc948909(v=vs.85).aspx.

(Continued)

*Primary Examiner* — Christopher McCarthy
(74) *Attorney, Agent, or Firm* — Larson Newman, LLP (57) ABSTRACT

An information handling system includes a remediation sever to receive an indication of an error condition at a data processing device via an Internet connection, the indication including an error code. The information handling system also includes a data storage device coupled to the remediation server, the data storage device to store a remediation database including error resolution procedures associated with error conditions. Each error condition is uniquely identified by an error code. An error code includes a concatenation of an alphanumeric string identifying a software application associated with the error condition, an alphanumeric string identifying an action to resolve the error condition, and an alphanumeric string identifying a software service corresponding to resolution of the error condition.

18 Claims, 8 Drawing Sheets

(56) References Cited

U.S. PATENT DOCUMENTS

| | | | |
|---|---|---|---|
| 8,645,760 B2* | 2/2014 | van Gilluwe | G06F 9/4446 714/38.1 |
| 2003/0167421 A1 | 9/2003 | Klemm | |
| 2006/0184264 A1* | 8/2006 | Willis | G05B 19/4184 700/108 |
| 2008/0215922 A1* | 9/2008 | Cheng | G06F 11/3664 714/39 |
| 2010/0115348 A1* | 5/2010 | Gilluwe | G06F 17/30386 714/57 |
| 2010/0153789 A1* | 6/2010 | Tajima | G06F 11/0769 714/46 |
| 2015/0106701 A1* | 4/2015 | Honma | G06F 17/276 715/259 |

OTHER PUBLICATIONS

"Troubleshooting Software Distribution Using Custom Error Codes," Microsoft System Center, 2016 https://technet.microsoft.com/en-us/library/bb735865.aspx.

* cited by examiner

| Error Code | Application Name | Severity | Resolution Text | Service Name | Automation Program Name | Unique Code |
|---|---|---|---|---|---|---|
| GLV2RSTRTINV101 | Glovia | 2 | Restart Invoice Service | Invoice | Automate GLVRSTRTINV101 | 101 |
| GLV2RSTRTINV102 | Glovia | 2 | Replay Invoice | Invoice | Automate GLVRSTRTINV102 | 102 |
| GLV2RSTRTINV103 | Glovia | 2 | Purge Invoice | Invoice | Automate GLVRSTRTINV103 | 103 |

*FIG. 4*

| Error Code | Resolution Text | Timestamp | Automation Program Name | Auto. Input | Auto. Output | Automation Trigger Time |
|---|---|---|---|---|---|---|
| GLV2RSTRTINV101 | Restart Invoice Service | 01/01/2015 11:59:00 | Automate GLV2RSTRTINV 101 | 5849393 040 | Success | 01/01/2015 11:59:00 |
| GLV2RSTRTINV102 | Replay Invoice | 01/01/2015 11:59:00 | Automate GLV2RSTRTINV 102 | 5849393 041 | Success | 01/01/2015 11:59:00 |
| GLV2RSTRTINV103 | Purge Invoice | 01/01/2015 11:59:00 | Automate GLV2RSTRTINV 103 | 5849393 042 | Success | 01/01/2015 11:59:00 |

SYSTEM AND METHOD FOR ENCODING EXCEPTION CONDITIONS INCLUDED AT A REMEDIATION DATABASE

FIELD OF THE DISCLOSURE

This disclosure relates generally to information handling systems, and more particularly relates to encoding exception conditions included at a remediation database.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

An information handling system includes a remediation sever to receive an indication of an error condition at a data processing device via an Internet connection, the indication including an error code. The information handling system also includes a data storage device coupled to the remediation server, the data storage device to store a remediation database including error resolution procedures associated with error conditions. Each error condition is uniquely identified by an error code. An error code includes a concatenation of an alphanumeric string identifying a software application associated with the error condition, an alphanumeric string identifying an action to resolve the error condition, and an alphanumeric string identifying a software service corresponding to resolution of the error condition.

BRIEF DESCRIPTION OF THE DRAWINGS

Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings certainly can be utilized in this application.

The number of data processing devices in our home and workplace is quickly increasing, and these devices are frequently connected to a data network, providing what is often referred to as the Internet of things. Modern devices and software applications often rely on proper interactivity and functionality of two or more software processes that work together to implement the device or application. As the complexity of these systems increases, so might the frequency of failures. The majority of errors that a user may experience are not hardware failures, but rather software related. For example, an exception effecting operation of an electronic-mail server process may render a user's mail browser inoperable. Further, a majority of these failures may be foreseen, meaning that the interdependencies are known to the product developer. Users of data processing devices are likely familiar with the ubiquitous hexadecimal error messages encountered when something goes wrong. Worse still, a malfunction may not generate any information identifying a possible cause for a malfunction.

FIGS. 1-8 illustrate techniques for improving how devices respond to an error condition. A device, and software applications and processes included therein can be engineered to provide information suitable for resolving an error. For example, when an error involving a foreseen error condition is encountered, error reporting processes can provide information that illuminates the specific inter-process relationship that has failed. Even if a particular error condition has not been foreseen, error processing logic can provide information that may facilitate diagnosis and recovery. Techniques described herein include generation of standardized and human readable error codes that provide information identifying the application encountering an error, a severity of the error, a resolution protocol, a name of a service or sub-process that has failed, and the like.

In one embodiment, the error code can be transmitted to a remediation server, for example via an Internet connection. Alternatively, a service provider or another remediation entity can automatically and remotely monitor devices via an Internet connection, access stored error codes, and facilitate remediation. If automated remediation is unavailable, the human readable error code should provide a user of the device with meaningful insight into the nature of the malfunction, including information identifying how to resolve the failure. A database of error codes can be maintained at an error code repository accessible to the remediation server. The database can be indexed by the error code, and each code can direct automated processes to remedy the failure, or provide a technician with remediation procedures. For example, the error code may identify a mail browser application and indicate that an identified mail server process must be restarted.

Figure 1:
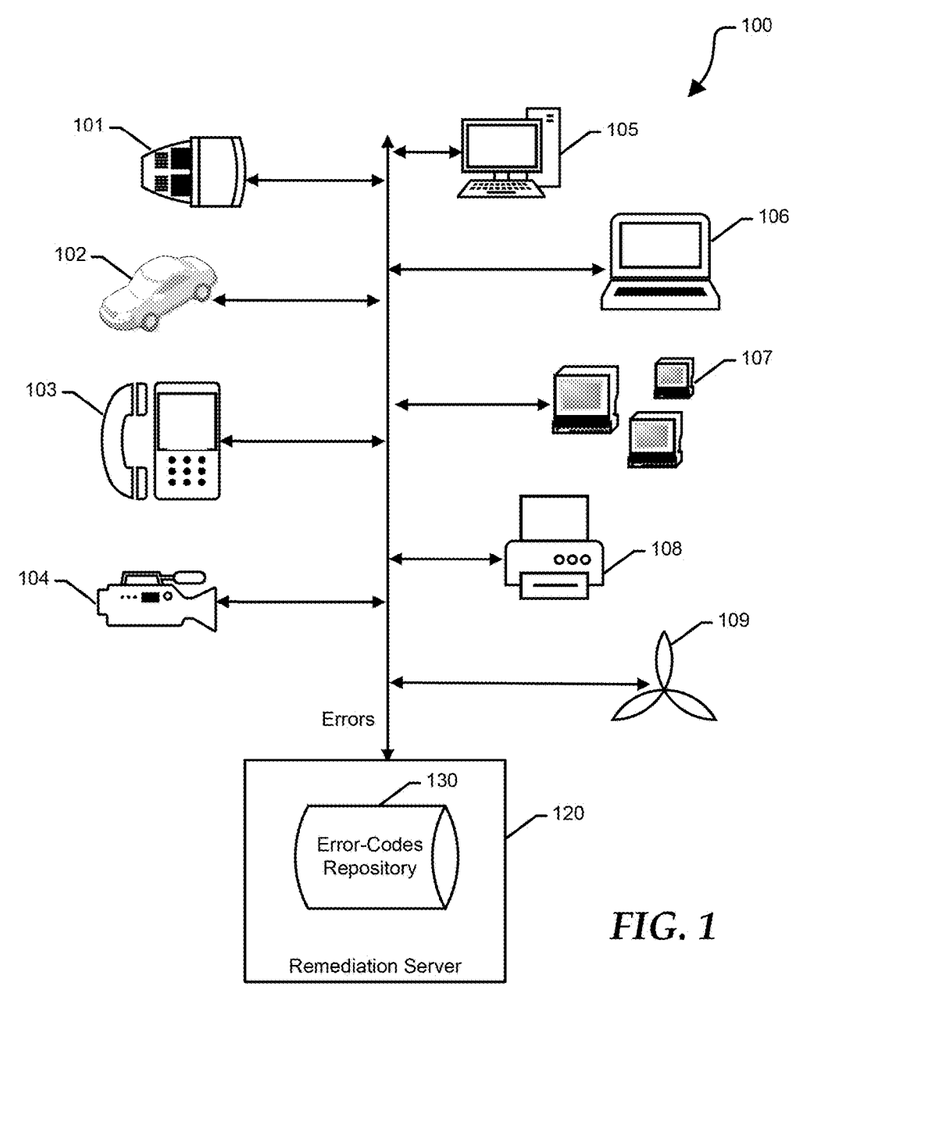
FIG. 1 is a block diagram illustrating an error processing system according to a specific embodiment of the present disclosure.

FIG. 1 shows an information handling system 100 that may represent a collection of data processing devices, appliances, home and office control systems, and the like. These devices can include a television 101, automobile 102, telephone equipment 103, video capture devices 104, a home computer 105, another type of personal data equipment 106, business workstations 107, a printer 108, an air flow control system 109, and the like. Each of the devices 101-109 can include a network interface, such as the capability of sending and receiving information via the Internet or another type of data network. In an embodiment, each of these devices can include software and/or hardware modules configured to identify the occurrence of an error, and report the error using a human readable error code.

The human readable error code can include an alphanumeric string identifying the name of the application or device experiencing an error condition, an action to resolve the first error condition, a software service corresponding to resolution of the first error condition, and the like. For example, a human readable error code:

$$\text{GLV2RSTRTINV101} \tag{1}$$

includes five alphanumeric strings; "GLV" identifying the application experiencing the error, "2" identifying a severity of the error, "RSTRT" indicating that the error can be resolved by restarting a service, "INV" identifying a name of the software service to be restarted, and "101" to uniquely associate the error or software service with the first error condition.

The error code can be transmitted to a remediation server or a service provider, which can include access to a central database of error codes. The error code database can be indexed using the human readable error code and provide remediation details for all foreseen error conditions. In the event that the error condition is not foreseen by a device, the human readable error code generated by the device experiencing an error can provide technicians with information that can be beneficial in diagnosing the error condition. Following resolution of the error condition, a corresponding error code can be incorporated into the central database.

Figure 2:
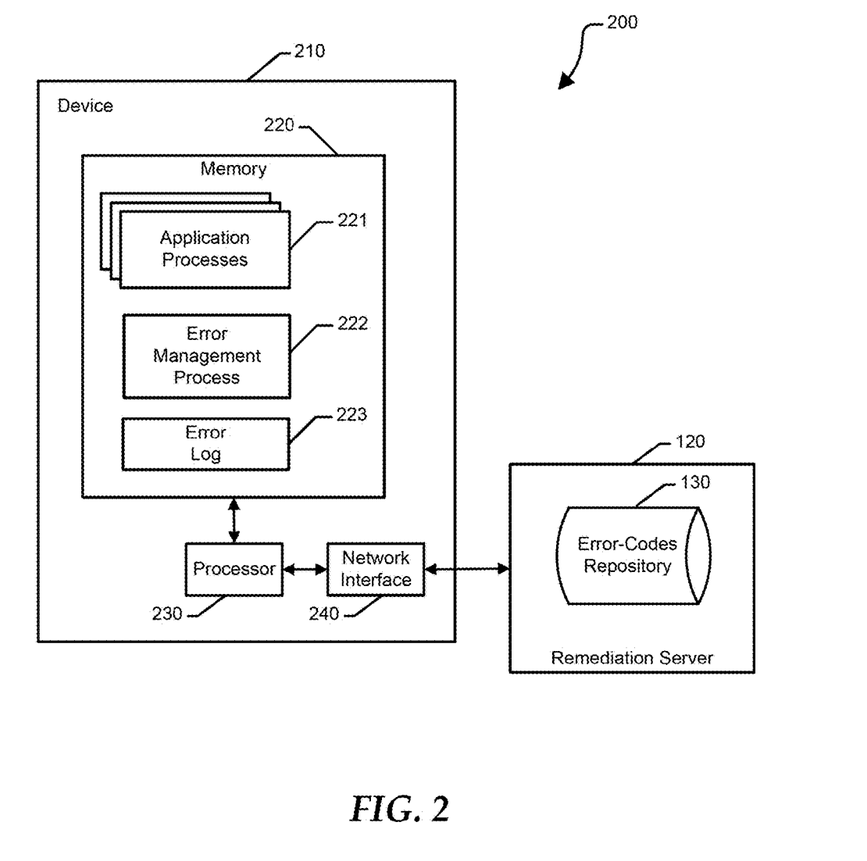
FIG. 2 is a block diagram illustrating the power management control module of FIG. 1 in accordance with a specific embodiment of the present disclosure.

FIG. 2 shows an error processing system 200 that includes a data processing device 210 coupled to remediation server 120. Data processing device 210 includes a memory device, a processor 230, and a network interface 240. Remediation server 120 includes error codes repository 130. During execution of an application at device 210 by processor 230, multiple processes can be maintained at memory 220, including one or more application processes 221, error management process 222. The application can further maintain an error log 223. Data processing device 210 can include additional components and the application can maintain other processes at memory 220, not shown for clarity.

Application processes 221 can include one or more primary application processes and may include additional sub-processes, such as services. Interaction between each of sub-processes 221 is essential for the application to be fully operational. Error conditions can be associated with each of the processes or sub-processes. As used herein, processes and services can include any portion of a software or hardware system that provides a desired function at a device. Examples of processes include print servers, device drivers, base board management systems and other embedded controllers, user interface systems, and the like.

Error management process 222 can include an active runtime process, or may include an error-initiated subroutine, such as a process triggered in response to an interrupt or trap condition. Error management process 222 can be configured to respond to foreseen and unforeseen error conditions. For example, error management process 222 can maintain or collect information about the current state of device 210, the state of active applications, and the state of individual processes on which the applications depend. In response to identifying an error condition, error management process 222 is configured to generate a human readable error code, store the error code at error log 223, and in one embodiment, transmit the error code to remediation server 120.

Figure 3:
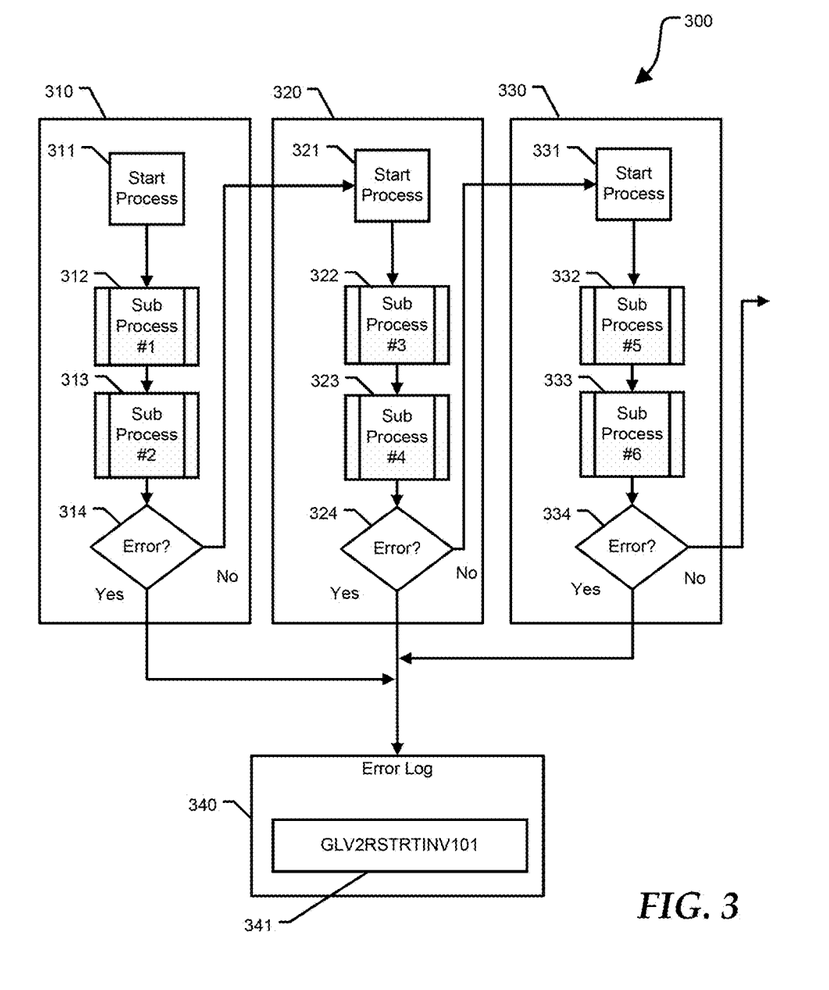
FIG. 3 is a flow diagram illustrating an interrelationship between processes and sub-processes that together provide an application at a data processing device according to a specific embodiment of the present disclosure.

FIG. 3 shows an interrelationship between processes and sub-processes that together provide an application 300 at a data processing device according to a specific embodiment of the present disclosure. Application 300 can include a software program explicitly executed by a user of device 210, or may represent embedded functionality inherent with operation of device 210. For example, application 300 can represent a home management system that monitors security systems, ventilation and heating systems, smoke detectors, and the like. Application 300 includes three processes, 310, 320, and 330. Process 310 can include sub-processes 312 and 313, provide an interface to start the process 311, and error processing logic 314. Similarly, process 320 can include sub-processes 322 and 323, provide an interface to start the process 321, and error processing logic 324; and process 330 can include sub-processes 332 and 333, provide an interface to start the process 331, and error processing logic 334.

During operation of application 300, each of processes 310, 320, and 330 can be configured to identify an error condition. The error condition can be related to operation of the corresponding process, or may be related to a failure to properly communicate with other processes. Error processing logic 314 can include one or more processes, such as error management process 222, logic gates, or a combination thereof. Application 300, and associated processes 310, 320, and 330 can be architected to provide substantive process monitoring and error reporting necessary to generate the informative human readable error codes in response to foreseen and unforeseen error conditions.

Figure 4:
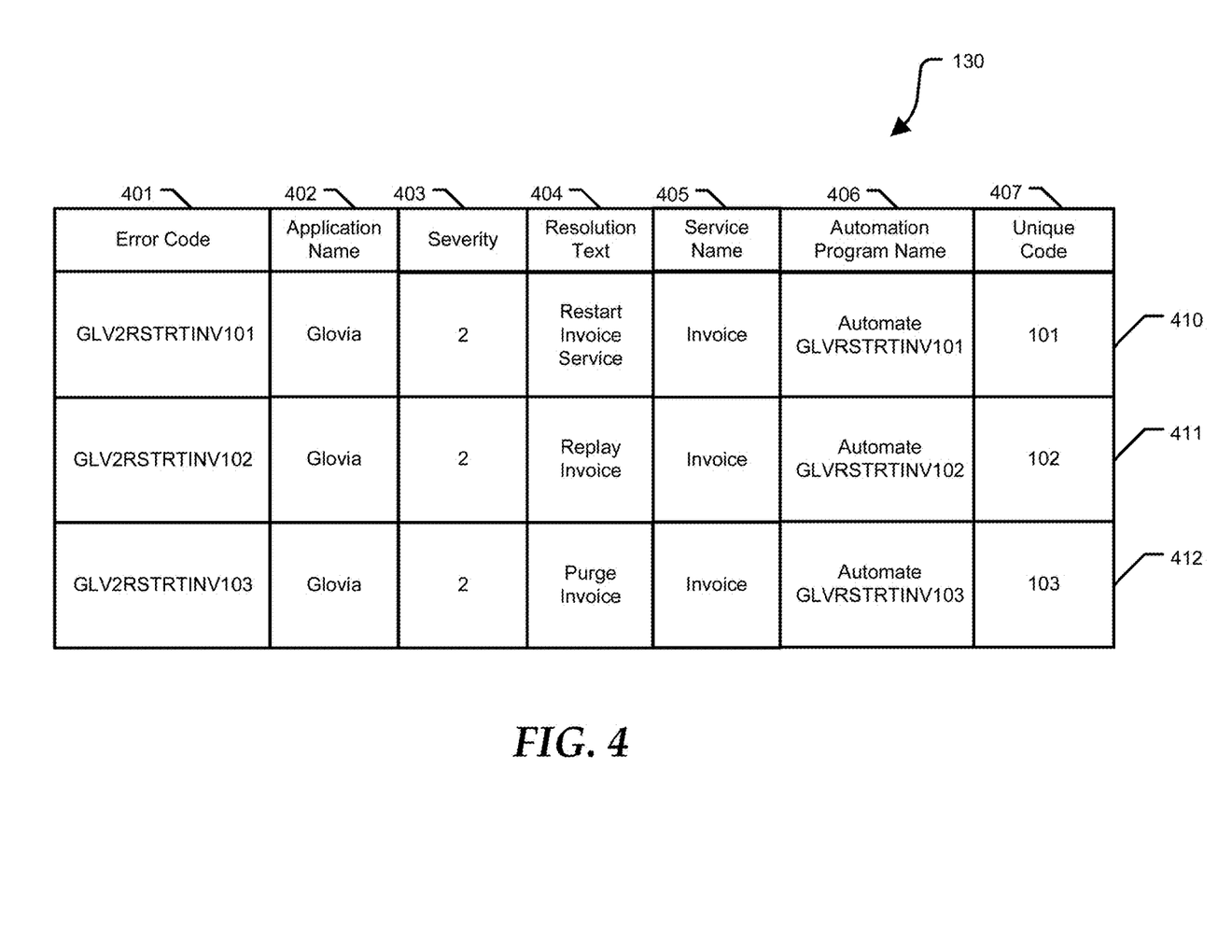
FIG. 4 is a table representing the error codes repository of FIGS. 1 and 2 according to a specific embodiment of the present disclosure.

FIG. 4 shows a table representing error codes repository 130 of FIGS. 1 and 2 according to a specific embodiment of the present disclosure. Repository 130 can provide a master list of all resolved error conditions. In an embodiment, error management process 222 can determine whether a present error condition, and corresponding error code, is included in repository 130. A new entry corresponding to a previously unforeseen error condition can be added to repository 130 following resolution of the error condition. The resolution can include development or enhancement of an automation program that is configured to perform the resolution. Repository 130 includes seven columns, the first column 401 for storing an error code. The remaining six columns include information about the error. Column 402 includes a name of the application or device experiencing the error. Column 403 specifies a severity of the error condition. Column 404 includes resolution text identifying an action needed to resolve the error condition. Column 405 identifies a name of a service associated with resolution of the error. Column 406 identifies a name of an automation program that can be used to implement the resolution. Column 407 includes a code to uniquely associate the error or software service with the first error condition. One of skill will appreciate that error code repository 130 can include additional or fewer columns and can provide further information documenting the error condition and its resolution.

Figure 5:
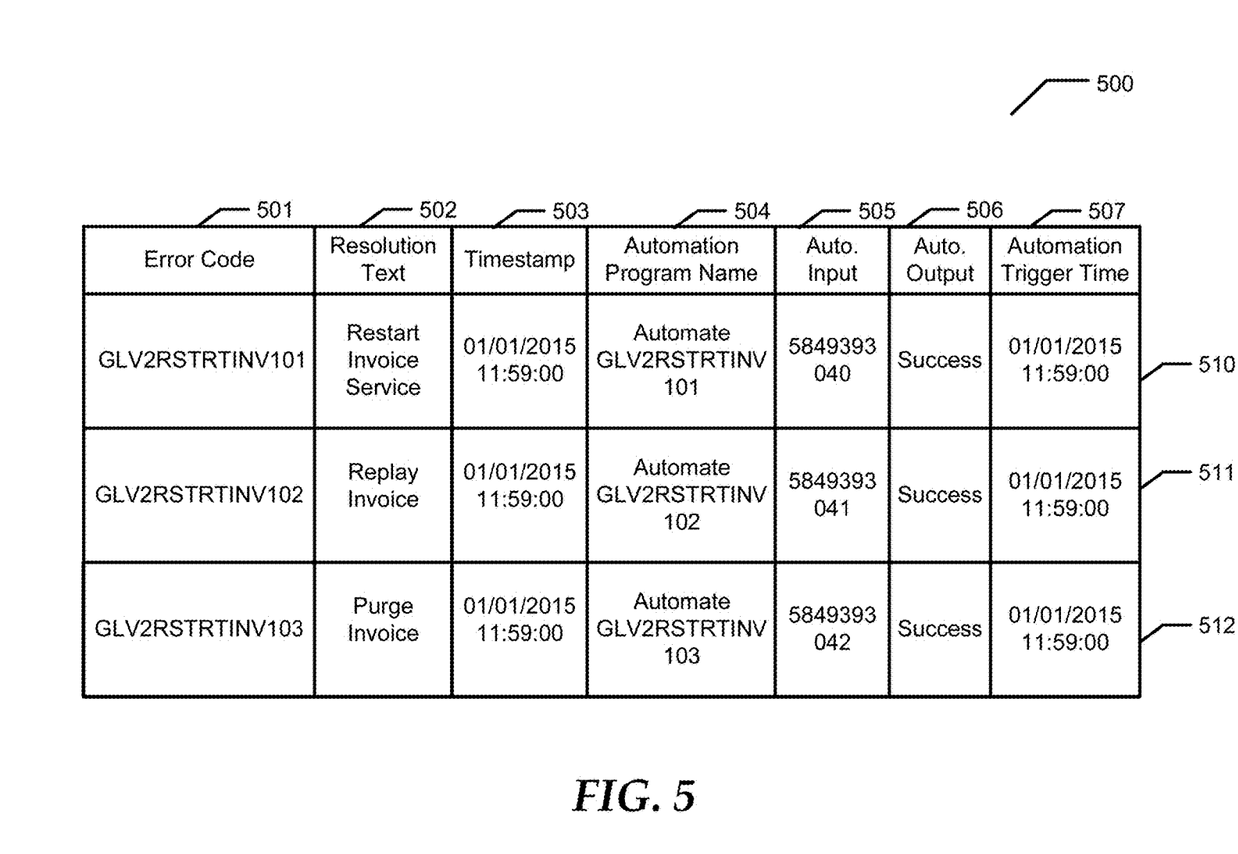
FIG. 5 is a table representing an error reporting log according to a specific embodiment of the present disclosure.

FIG. 5 shows reporting log 500 according to a specific embodiment of the present disclosure. Log 500 can include a record of both foreseen and unforeseen errors. Alternatively, separate logs may be maintained corresponding individually to foreseen and unforeseen errors. Log 500 includes seven columns, the first column 501 for storing an error code. The remaining six columns include information about the error. Column 502 includes resolution text identifying an action needed to resolve the error condition corresponding to the error code of column 501. Column 503 provides a timestamp identifying when the error occurred. Column 504 includes an automation program name identifying a program that can be executed to carry out the resolution. Column 504, and the additional columns, may not include information until the error condition has been resolved and an automation program has been developed. Column 505 specifies information that is provided to the automation program, and column 506 includes output provided by the resolution program, such as an indication of success or failure. Column 507 provides an indication of a time that the automation program was executed. Successive rows 510, 511, 512, and others, not shown, identify specific error codes and their corresponding processing information. One of skill will appreciate that error code repository 130 can include additional or fewer columns and can provide further information about an occurrence and resolution of an error condition.

Figure 6:
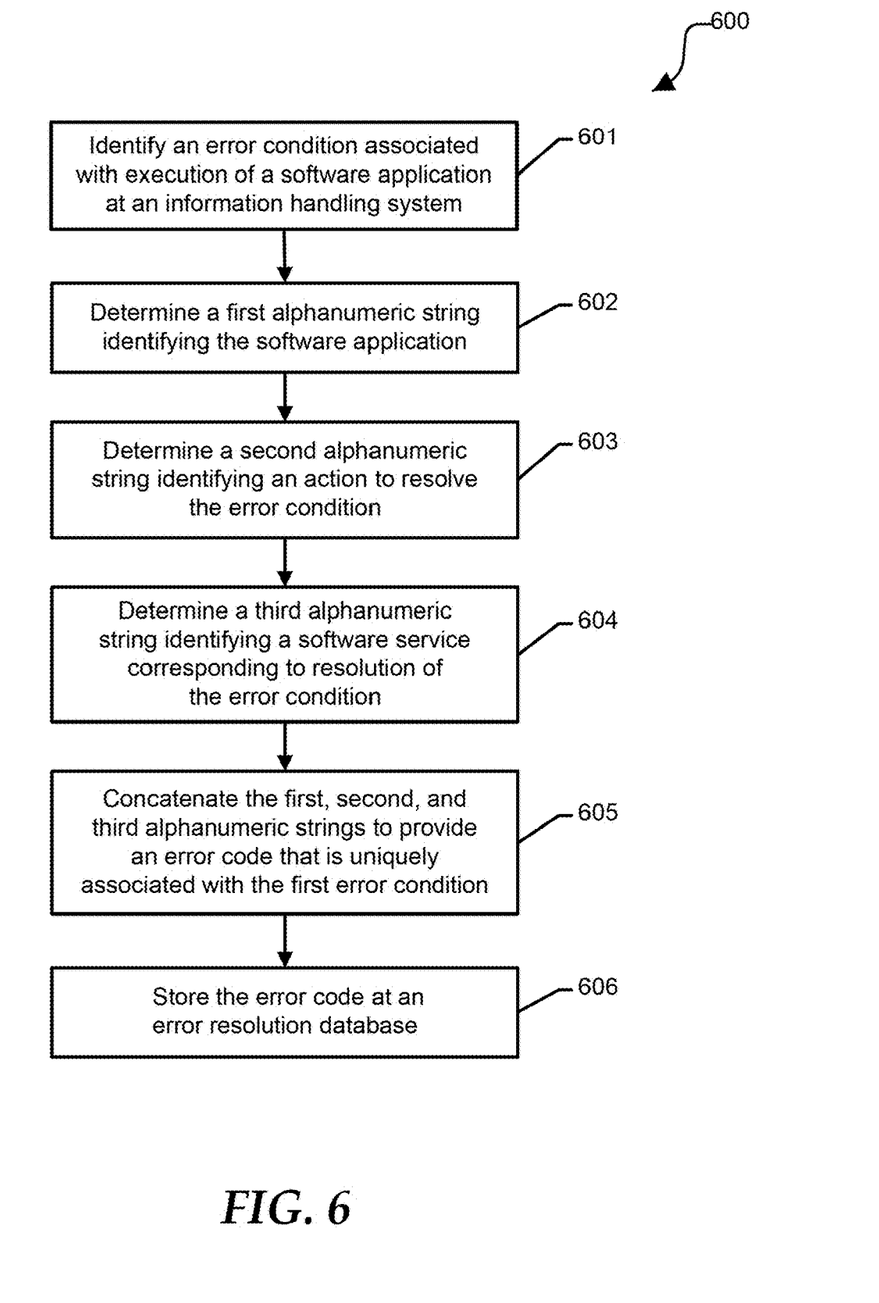
FIG. 6 is a flow diagram illustrating a method for generating human readable error codes according to a specific embodiment of the present disclosure.

FIG. 6 shows a method 600 for generating human readable error codes according to a specific embodiment of the present disclosure. Method 600 illustrates a procedure for generating human readable error codes corresponding to foreseen error conditions. Method 600 begins at block 601 where a foreseen error condition associated with execution of a software application or device firmware at an information handling system is identified. For example, process 310 of FIG. 3 can be designed to evaluate the health of dependent processes according to foreseen error conditions. Process 310 can generate a human readable error code that provides detailed information about the error condition and its resolution. In particular, at block 602, a first alphanumeric string identifying the software application that can experience the error is determined. At block 603, a second alphanumeric string identifying an action necessary to resolve the error condition is determined. At block 604 a third alphanumeric string identifying a software service corresponding to resolution of the error condition is determined. At block 605 the first, second, and third alphanumeric strings are concatenated to provide the human readable error code that is uniquely associated with the first error condition. At block 606, the error code is stored at an error resolution database. The database can provide information relating to actions necessary to resolve an error, as well as information documenting aspects of unforeseen errors and information logging the occurrence and resolution of errors.

Figure 7:
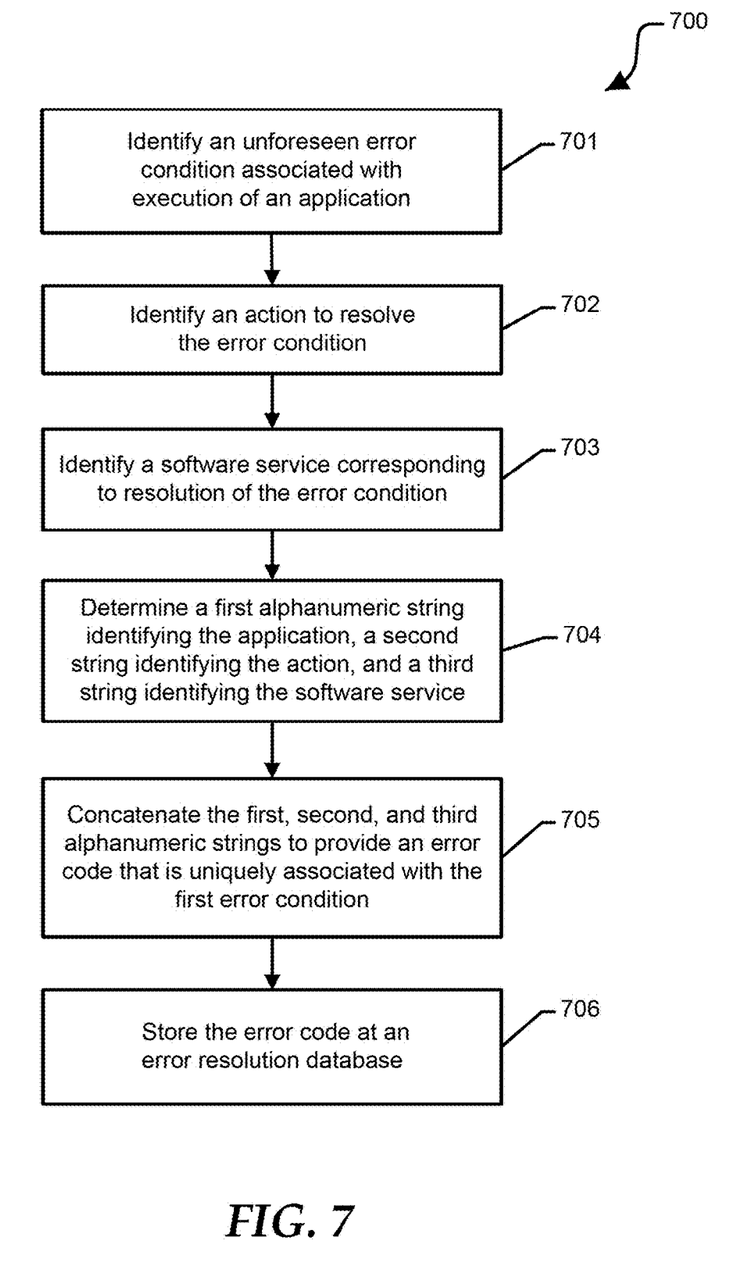
FIG. 7 is a flow diagram illustrating a method for generating human readable error codes according to another embodiment of the present disclosure.

FIG. 7 shows a a method 700 for generating human readable error codes according to a specific embodiment of the present disclosure. Method 700 illustrates the diagnosis of an unforeseen error condition, and subsequent generation of a human readable error code documenting the error and its resolution. Method 700 begins at block 701 where an unforeseen error condition associated with execution of an application is identified. In an embodiment, the application can include a software application or a device. Diagnosis of the error commences at block 702 where an action to resolve the error condition is identified. At block 703, a software service corresponding to resolution of the error condition is identified. Method 700 continues at block 704 where a first alphanumeric string identifying the application, a second alphanumeric sting identifying the action, and a third alphanumeric string identifying the software service is determined.

At block 705, the first, second, and third alphanumeric strings are concatenated to provide a human readable error code that is uniquely associated with the first error condition. At block 606, the error code is stored at an error resolution database. The error code can include addition alphanumeric strings identifying additional information concerning the error condition, such as a severity level. The error code can include formatting characters, such as underscores, separating the alphanumeric stings to further improve readability. Applications and remediation servers can be updated to recognize the error condition and to generate the appropriate human readable error code when the error is encountered.

Figure 8:
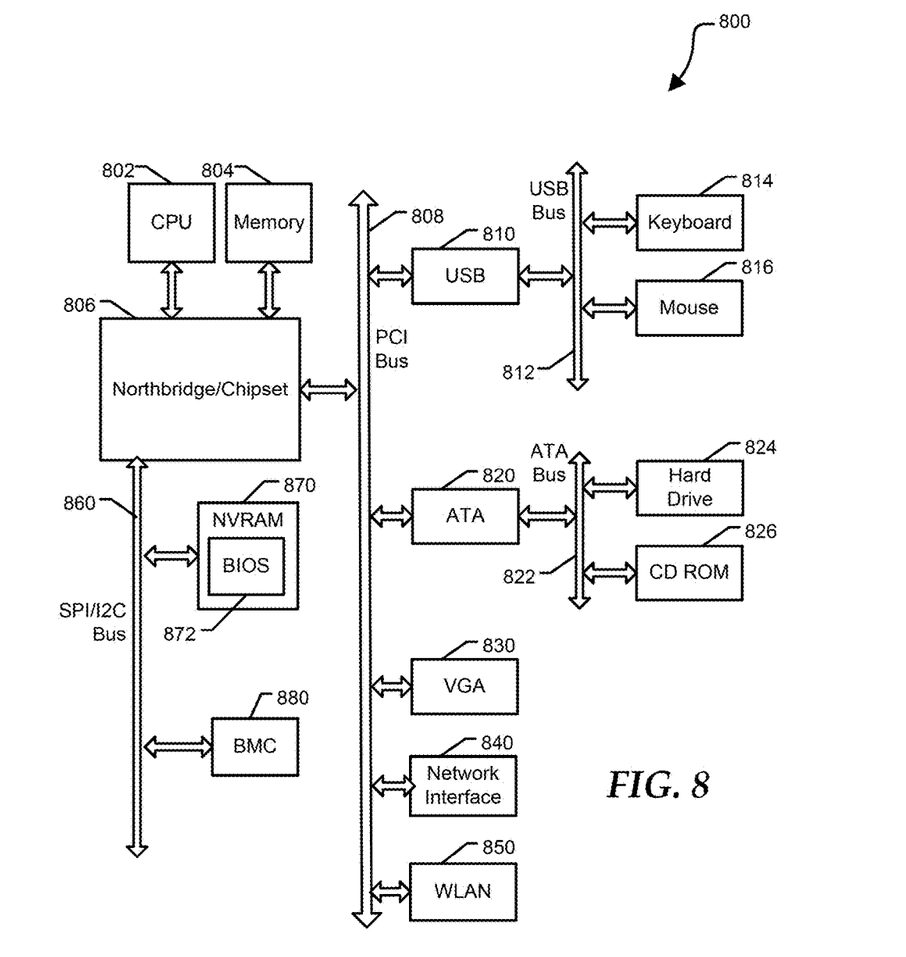
FIG. 8 is a block diagram illustrating an information handling system in accordance with a specific embodiment of the present disclosure.

FIG. 8 shows an information handling system 800 including a processor 802, a memory 804, a northbridge/chipset 806, a PCI bus 808, a universal serial bus (USB) controller 810, a USB 812, a keyboard device controller 814, a mouse device controller 816, a configuration an ATA bus controller 820, an ATA bus 822, a hard drive device controller 824, a compact disk read only memory (CD ROM) device controller 826, a video graphics array (VGA) device controller 830, a network interface controller (NIC) 840, a wireless local area network (WLAN) controller 850, a serial peripheral interface (SPI) bus 860, a NVRAM 870 for storing BIOS 872, and a baseboard management controller (BMC) 880. BMC 880 can be referred to as a service processor or embedded controller (EC). Capabilities and functions provided by BMC 880 can vary considerably based on the type of information handling system. For example, the term baseboard management system is often used to describe an embedded processor included at a server, while an embedded controller is more likely to be found in a consumer-level device. As disclosed herein, BMC 880 represents a processing device different from CPU 802, which provides various management functions for information handling system 800. For example, an embedded controller may be responsible for power management, cooling management, and the like. An embedded controller included at a data storage system can be referred to as a storage enclosure processor.

For purpose of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 800 can include processing resources for executing machine-executable code, such as CPU 802, a programmable logic array (PLA), an embedded device such as a System-on-a-Chip (SoC), or other control logic hardware. Information handling system 800 can also include one or more computer-readable medium for storing machine-executable code, such as software or data.

System 800 can include additional processors (not shown at FIG. 1) that are configured to provide localized or specific control functions, such as a battery management controller. Bus 860 can include one or more busses, including a SPI bus, an I2C bus, a system management bus (SMBUS), a power management bus (PMBUS), and the like. BMC 880 can be configured to provide out-of-band access to devices at information handling system 800. As used herein, out-of-band access herein refers to operations performed prior to execution of BIOS 872 by processor 802 to initialize operation of system 800.

BIOS 872 can be referred to as a firmware image, and the term BIOS is herein used interchangeably with the term firmware image, or simply firmware. BIOS 872 includes instructions executable by CPU 802 to initialize and test the hardware components of system 800, and to load a boot loader or an operating system (OS) from a mass storage device. BIOS 872 additionally provides an abstraction layer for the hardware, i.e. a consistent way for application programs and operating systems to interact with the keyboard, display, and other input/output devices. When power is first applied to information handling system 800, the system begins a sequence of initialization procedures. During the initialization sequence, also referred to as a boot sequence, components of system 800 are configured and enabled for operation, and device drivers can be installed. Device drivers provide an interface through which other components of the system 800 can communicate with a corresponding device.

Information handling system 800 can include additional components and additional busses, not shown for clarity. For example, system 800 can include multiple processor cores, audio devices, and the like. While a particular arrangement of bus technologies and interconnections is illustrated for the purpose of example, one of skill will appreciate that the techniques disclosed herein are applicable to other system architectures. System 800 can include multiple CPUs and redundant bus controllers. One or more components can be integrated together. For example, portions of northbridge/chipset 806 can be integrated within CPU 802. Additional components of information handling system 800 can include one or more storage devices that can store machine-executable code, one or more communications ports for communicating with external devices, and the like. An example of information handling system 800 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 800 can include a set of instructions that can be executed to cause the information handling system to perform any one or more of the methods or computer based functions disclosed herein. The information handling system 800 may operate as a standalone device or may be connected to other computer systems or peripheral devices, such as by a network.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The information handling system 800 can include a disk drive unit and may include a computer-readable medium, not shown in FIG. 8, in which one or more sets of instructions, such as software, can be embedded. Further, the instructions may embody one or more of the methods or logic as described herein. In a particular embodiment, the instructions may reside completely, or at least partially, within system memory 804 or another memory included at system 800, and/or within the processor 802 during execution by the information handling system 800. The system memory 804 and the processor 802 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising: identifying a first error condition associated with execution of a software application at an information handling system; determining a first alphanumeric string identifying the software application; determining a second alphanumeric string identifying an action to resolve the first error condition; determining a third alphanumeric string identifying a software service corresponding to resolution of the first error condition; concatenating the first, second, and third alphanumeric strings to provide a first error code that is uniquely associated with the first error condition; and storing the first error code at an error resolution database; wherein correct operation of the software application is dependent upon an operational state of the software service.

2. The method of claim 1, wherein the software service identified by the third alphanumeric string is to be restarted to resolve the first error condition.

3. The method of claim 1, wherein the first error code includes a fourth alphanumeric string to uniquely associate the application with the first error condition.

4. The method of claim 1, wherein the first error code includes a fourth alphanumeric string identifying a severity level of the first error condition.

5. The method of claim 1, wherein the error resolution database includes a plurality of error codes corresponding to respective foreseen error conditions, the database accessible to an automated error recovery system.

6. The method of claim 1, further comprising:
receiving, at a remediation server, an indication that the software application experienced the first error condition, the indication including the first error code;
accessing the error resolution database based on the first error code; and
administering the action to resolve the first error condition.

7. The method of claim 1, further comprising:
periodically scanning, by a service provider, a client information handling system to identify posting of the first error code at an error log at the client information handling system;
accessing the error resolution database based on the first error code; and
administering the action to resolve the first error condition.

8. The method of claim 1, wherein the first error code includes sixteen or fewer alphanumeric characters, and provides a user with information on how to resolve the first error condition.

9. An information handling system comprising: a remediation sever operable to receive an indication of an error condition at a data processing device via an Internet connection, the indication including a first error code; and a data storage device coupled to the remediation server, the data storage device to store a remediation database including a first error resolution procedure associated with a first error condition, the first error condition uniquely identified by the first error code, the first error code including a concatenation of: a first alphanumeric string identifying a first software application associated with the first error condition; a second alphanumeric string identifying an action to resolve the first error condition; and a third alphanumeric string identifying a software service corresponding to resolution of the first error conditions; wherein correct operation of the software application is dependent upon an operational state of the software service.

10. The system of claim 9, wherein the software service identified by the third alphanumeric string is to be restarted to resolve the first error condition.

11. The system of claim 9, wherein the first error code includes a fourth alphanumeric string to uniquely associate the application with the first error condition.

12. The system of claim 9, wherein the first error code includes a fourth alphanumeric string identifying a severity level of the first error condition.

13. The system of claim 9, wherein the remediation server is to:
receive an indication that the first software application experienced the first error condition, the indication including the first error code;
access the resolution database based on the first error code; and
administer the action to resolve the first error condition.

14. The system of claim 9, wherein the remediation server is to:
periodically scan a client information handling system to identify posting of the first error code at an error log at the client information handling system;
access the resolution database based on the first error code; and
administer the action to resolve the first error condition.

15. A method comprising: identifying an unforeseen first error condition associated with execution of a software application at an information handling system; identifying an action to resolve the first error condition; identifying a software service corresponding to resolution of the first error; determining a first alphanumeric string identifying the software application; determining a second alphanumeric string identifying the action to resolve the first error condition; determining a third alphanumeric string identifying the software service; concatenating the first, second, and third alphanumeric strings to provide a first error code that is uniquely associated with the error condition; and storing the first error code at a resolution database; wherein correct operation of the software application is dependent upon an operational state of the software service.

16. The method of claim 15, wherein the software service identified by the third alphanumeric string is to be restarted to resolve the first error condition.

17. The method of claim 15, wherein the first error code includes a fourth alphanumeric string to uniquely associate the application with the first error condition.

18. The method of claim 15, wherein the first error code includes a fourth alphanumeric string identifying a severity level of the first error condition.

* * * * *